United States Patent
Menon et al.

(10) Patent No.: US 7,725,687 B2
(45) Date of Patent: May 25, 2010

(54) REGISTER FILE BYPASS WITH OPTIONAL RESULTS STORAGE AND SEPARATE PREDICATION REGISTER FILE IN A VLIW PROCESSOR

(75) Inventors: Amitabh Menon, Lewisville, TX (US); David J. Hoyle, Sugarland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 378 days.

(21) Appl. No.: 11/769,191

(22) Filed: Jun. 27, 2007

(65) Prior Publication Data

US 2008/0016327 A1  Jan. 17, 2008

Related U.S. Application Data

(60) Provisional application No. 60/805,899, filed on Jun. 27, 2006.

(51) Int. Cl.
*G06F 9/34* (2006.01)

(52) U.S. Cl. .................................................... 712/218

(58) Field of Classification Search .................. None
See application file for complete search history.

(56) References Cited

U.S. PATENT DOCUMENTS

| | | | | |
|---|---|---|---|---|
| 6,145,074 A * | 11/2000 | Asato | ............................ | 712/218 |
| 6,427,207 B1 * | 7/2002 | Col et al. | ....................... | 712/245 |
| 6,944,751 B2 * | 9/2005 | Fetzer et al. | .................. | 712/218 |
| 2006/0041736 A1 * | 2/2006 | Garg et al. | ...................... | 712/23 |
| 2006/0095732 A1 * | 5/2006 | Tran et al. | ..................... | 712/217 |

FOREIGN PATENT DOCUMENTS

EP   1267258 A2 * 12/2002

* cited by examiner

*Primary Examiner*—Eric Coleman
(74) *Attorney, Agent, or Firm*—Robert D. Marshall, Jr.; W. James Brady; Frederick J. Telecky, Jr.

(57) ABSTRACT

This invention makes each register bypass forwarding register explicitly addressable in software. Software chooses whether to access the forwarding register immediately eliminating the need for complex automatic detection. Each instruction executes and always writes its result into the forwarding register. Writing this data into the register file in the next cycle is optional as selected by the destination register file number. This invention separates registers storing predication data from the register file. This separation removes the speed problem by enabling scheduling of the predication computation out of the critical path.

6 Claims, 6 Drawing Sheets

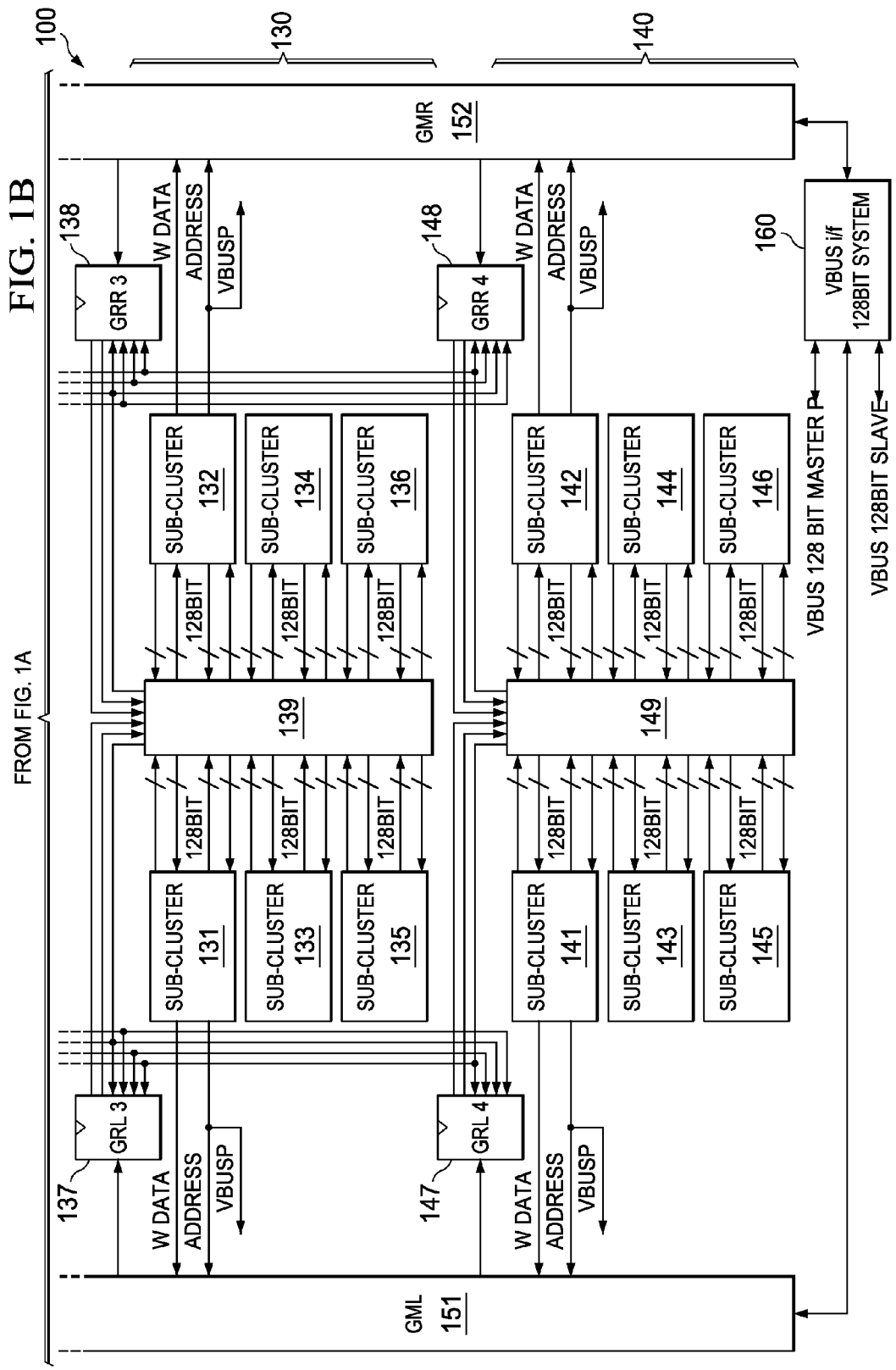

FIG. 4
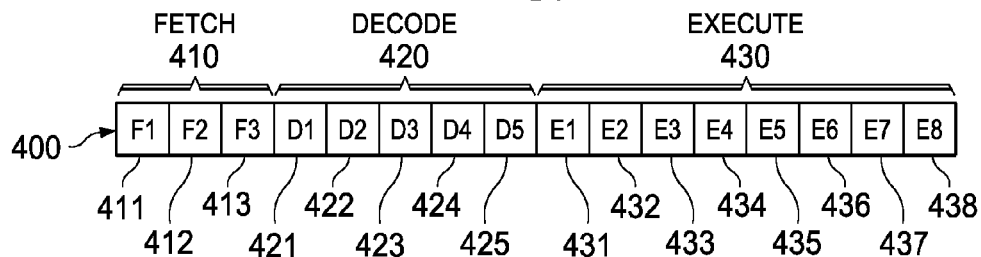
FIG. 5
| 39 | 38-35 | 34 | 33 | 32 | 31-29 | 28-24 | 23-19 | 18-14 | 13-9 | 8 | 7-0 |
|----|-------|----|----|----|-------|-------|-------|-------|------|---|-----|
| S | UNIT | P | K | Z | PRED | DST | OP3 | OP2 | OP1 | V | OPCODE |
FIG. 6
| 39 | 38-35 | 34 | 33 | 32 | 31-29 | 28-24 | 23-20 | 19-16 | 15-12 | 11-8 | 7-0 |
|----|-------|----|----|----|-------|-------|-------|-------|-------|------|-----|
| S | UNIT | P | K | Z | PRED | DST | OP2 SUB ID | OP2 | OP1 SUB ID | OP1 | OPCODE |
FIG. 7
(PRIOR ART)
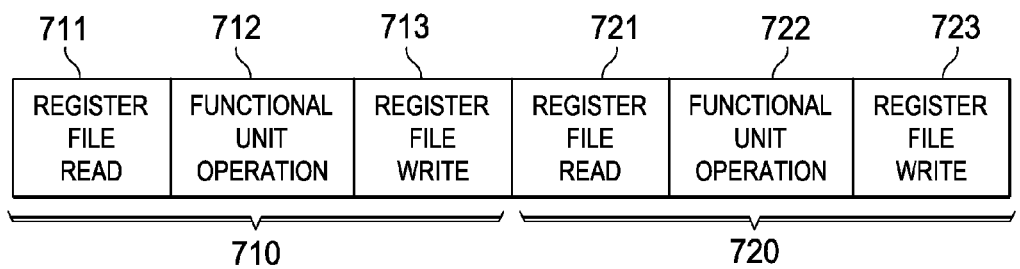

| - | - | W | x | x | x | x | x | R | - | - | READ / WRITE LIFETIME |
|---|---|---|---|---|---|---|---|---|---|---|---|
| 0 | 0 | 0 | 1 | 1 | 1 | 1 | 1 | 1 | 0 | 0 | REGISTER ACTIVE |

FIG. 10

| - | - | W | R | - | - | - | - | - | - | - | READ / WRITE LIFETIME |
|---|---|---|---|---|---|---|---|---|---|---|---|
| 0 | 0 | 0 | 0 | 0 | 0 | 0 | 0 | 0 | 0 | 0 | REGISTER ACTIVE |
| - | - | - | B | - | - | - | - | - | - | - | BYPASSED |
| - | - | - | K | - | - | - | - | - | - | - | KILLED |

FIG. 11

| - | - | W | x | R | - | - | - | - | - | - | READ / WRITE LIFETIME |
|---|---|---|---|---|---|---|---|---|---|---|---|
| 0 | 0 | 0 | 1 | 1 | 0 | 0 | 0 | 0 | 0 | 0 | REGISTER ACTIVE |
| - | - | - | - | - | - | - | - | - | - | - | BYPASSED |
| - | - | - | - | - | - | - | - | - | - | - | NOT KILLED |

FIG. 12

| - | - | W | R | R | - | - | - | - | - | - | READ / WRITE LIFETIME |
|---|---|---|---|---|---|---|---|---|---|---|---|
| 0 | 0 | 0 | 1 | 1 | 0 | 0 | 0 | 0 | 0 | 0 | REGISTER ACTIVE |
| - | - | - | B | - | - | - | - | - | - | - | BYPASSED |
| - | - | - | - | - | - | - | - | - | - | - | NOT KILLED |

FIG. 13

| - | - | W | R | x | x | x | R | - | - | - | READ / WRITE LIFETIME |
|---|---|---|---|---|---|---|---|---|---|---|---|
| 0 | 0 | 0 | 1 | 1 | 1 | 1 | 1 | 0 | 0 | 0 | REGISTER ACTIVE |
| - | - | - | B | - | - | - | - | - | - | - | BYPASSED |
| - | - | - | - | - | - | - | - | - | - | - | NOT KILLED |

FIG. 14

REGISTER FILE BYPASS WITH OPTIONAL RESULTS STORAGE AND SEPARATE PREDICATION REGISTER FILE IN A VLIW PROCESSOR

CLAIM OF PRIORITY

This application claims priority under 35 U.S.C. 119(e)(1) to U.S. Provisional Application No. 60/805,899 filed Jun. 27, 2006.

TECHNICAL FIELD OF THE INVENTION

The technical field of this invention is data processing devices and particularly very long instruction word (VLIW) processors.

BACKGROUND OF THE INVENTION

In any data processing apparatus central processing unit a critical speed path involves reading a register file to get data, operating on the data and writing the results back to the register file. The register file read and write delay reduces the speed of the processor. Register file bypass removes this problem by providing a second route for the data used by the functional units. The result data from a functional unit is routed to the register file as well as directly to a functional unit operand input if the results data written is required in the immediately following central processing unit cycle.

Register file bypass solves this speed problem but introduces other problems. A new problem created by register file bypassing is detecting when this bypass should be triggered. In a in a very long instruction word (VLIW) data processor this detection requires on the order of $n^2$ circuits, where n is the number of ports of the register file. This detection logic must provide a path from any register file port to any register file port. This requires a new level of complexity and cost. In a VLIW central processing unit with four 2-input functional units a total of 4×2 bypass networks are needed. Generally about 40% to 50% of all results data have a register lifetime of a single cycle. Thus nearly half of the time a value written to a register file is read only once in the next following central processing unit cycle. Thus much of the detection and forwarding logic required by register file bypassing is wasted. In addition the detection and forwarding logic presents a speed path to the predication feature, or ability to abort an instruction. Thus known register file bypass techniques are costly in terms of integrated circuit area, power use, cost and operation. Most prior art designs use either register file bypass or simply use circuit design techniques to minimize the problems.

SUMMARY OF THE INVENTION

This invention makes each forwarding register explicitly addressable in software. Thus software can choose to access the register immediately in the next cycle. This eliminates the need for complex automatic detection. Each instruction executes and always writes its result into the forwarding register. This register may be used in the next cycle or allowed to be written into the register file in the next cycle or both. This distinction is made via the destination register file number of the instructions. If the register number is a register file address the hardware writes to the register file, if the register destination is a bypass address the register file write is aborted.

This invention separates registers storing predication data from the register file. This separation removes the speed problem by enabling scheduling of the predication computation out of the critical path.

The invention employs simplified hardware design techniques relative to the prior art, while eliminating any critical speed paths. This invention reduces the amount of hardware needed to solve the same problem. This invention uses less power than automatic register bypass methods because up to half of the time the register file is not used.

BRIEF DESCRIPTION OF THE DRAWINGS

These and other aspects of this invention are illustrated in the drawings, in which:

FIGS. 1A and 1B together illustrate the organization of the data processor of the preferred embodiment of this invention;

FIG. 4 illustrates the pipeline stages of the data processor illustrated in FIG. 1;

FIG. 5 illustrates a first instruction syntax of the data processor illustrated in FIG. 1;

FIG. 6 illustrates a second instruction syntax of the data processor illustrated in FIG. 1;

FIG. 7 illustrates the sequence of an execution phase operational cycle within a functional unit of a data processor according to one aspect of the prior art;

FIG. 10 illustrates an example write/read instruction sequence to which this invention is not applicable;

FIG. 11 illustrates an example write/read instruction sequence to which both register file bypass and register write kill of this invention is applicable;

FIG. 12 illustrates an example write/read instruction sequence to which this invention is not applicable;

FIG. 13 illustrates an example write/read instruction sequence to which only register file bypass and not register write kill of this invention is applicable; and FIG. 14 illustrates an example write/read instruction sequence to which only register file bypass and not register write kill of this invention is applicable.

DETAILED DESCRIPTION OF PREFERRED EMBODIMENTS

Figure 1A:
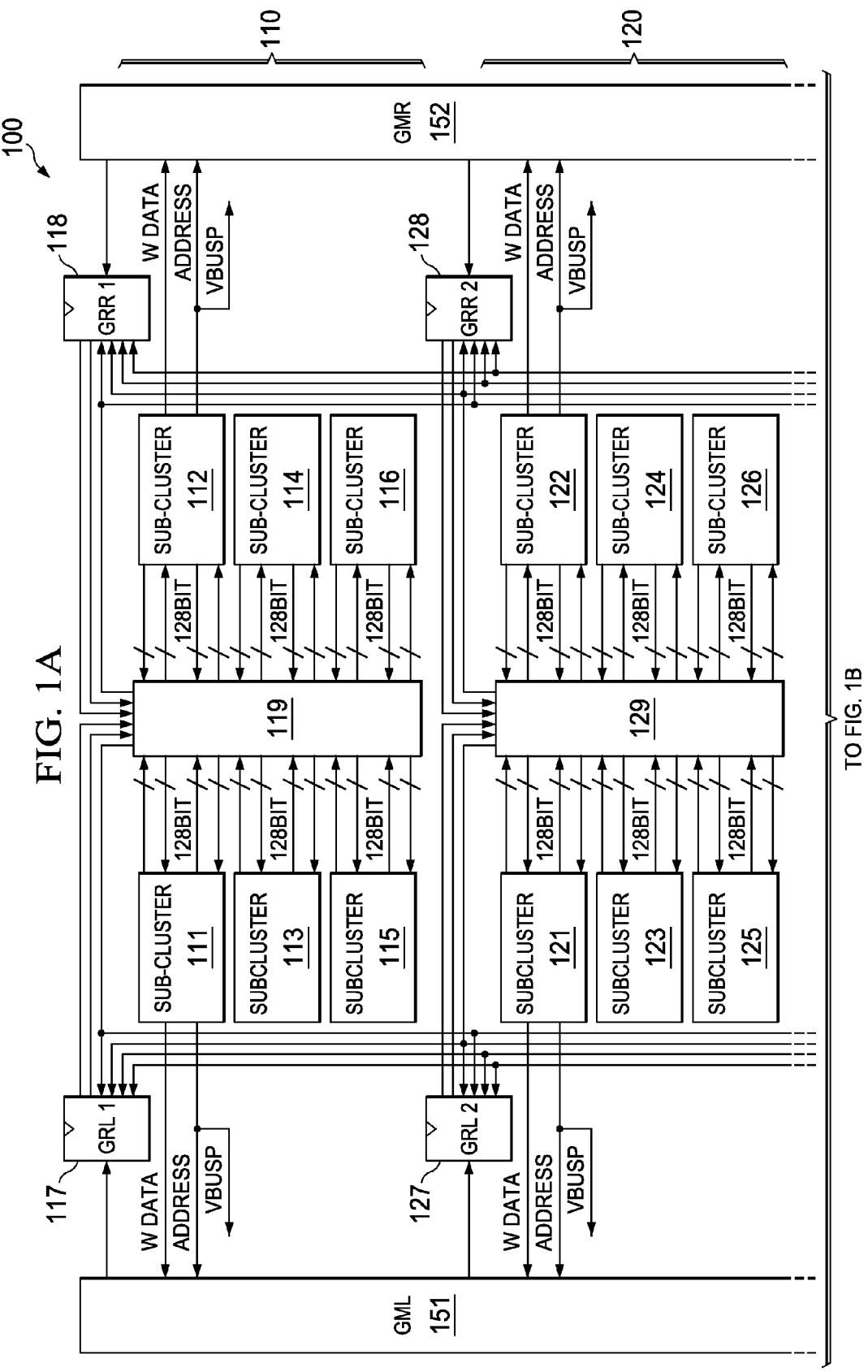

FIGS. 1A and 1B together illustrate a general block diagram of the data processor of this invention. Data processor 100 includes four data processing clusters 110, 120, 130 and 140. Each cluster includes six sub-clusters. Cluster 110 includes left sub-clusters 111, 113 and 115, and right sub-clusters 112, 114 and 116. The sub-clusters of cluster 110 communicate with other sub-clusters via transport switch 119. Besides connections to the sub-clusters, transport switch 119 also connects to global registers left 117 and global registers right 118. Global registers left 117 communicates with global memory left 151. Global registers right 118 communicates with global memory right 152. Global memory left 151 and global memory right 152 communicate with external devices via Vbus interface 160. Clusters 120, 130 and 140 are similarly constituted.

Each sub-cluster 111, 112, 113, 114, 115, 116, 121, 122, 123, 124, 125, 126, 131, 132, 133, 134, 135, 136, 141, 142, 143, 144, 145 and 146 includes main and secondary functional units, a local register file and a predicate register file. Sub-clusters 111, 112, 121, 122, 131, 132, 141 and 142 are called data store sub-clusters. These sub-clusters include main functional units having arithmetic logic units and memory load/store hardware directly connected to either global memory left 151 or global memory right 152. Each of these main functional units is also directly connected to Vbus interface 160. In these sub-clusters the secondary functional units are arithmetic logic units. Sub-clusters 112, 114, 122, 124, 132, 134, 142 and 144 are called math A sub-clusters. In these sub-clusters both the main and secondary functional units are arithmetic logic units. Sub-clusters 113, 116, 123, 126, 133, 136, 143 and 146 are called math M sub-clusters. The main functional units in these sub-clusters are multiply units and corresponding multiply type hardware. The secondary functional units of these sub-clusters are arithmetic logic units. Table 1 summarizes this disposition of functional units.

TABLE 1

| Sub-cluster Type | Main Functional Unit | Secondary Functional Unit |
|---|---|---|
| Data | Load/store and ALU | ALU |
| Math A | ALU | ALU |
| Math M | Multiply | ALU |

Data processor 100 generally operates on 64-bit data words. The instruction set allows single instruction multiple data (SIMD) processing at the 64-bit level. Thus 64-bit SIMD instructions can perform 2 32-bit operations, 4 16-bit operations or 8 8-bit operations. Data processor 100 may optionally operate on 128-bit data words including corresponding SIMD instructions.

Each cluster 110, 120, 130 and 140 is separated into left and right regions. The left region is serviced by the data left sub-cluster 111, 121, 131 or 141. The right region is serviced by data right sub-cluster 112, 122, 132 or 142. These are connected to the global memory system. Any memory bank conflicts are resolved in the load/store pipeline.

Each cluster 110, 120, 130 and 140 includes its own local memory. These can be used for holding constants for filters or some kind of ongoing table such as that used in turbo decode. This local memory is not cached and there is no bank conflict resolution. These small local memories have a shorter latency than the main global memory interfaces.

Figure 2:
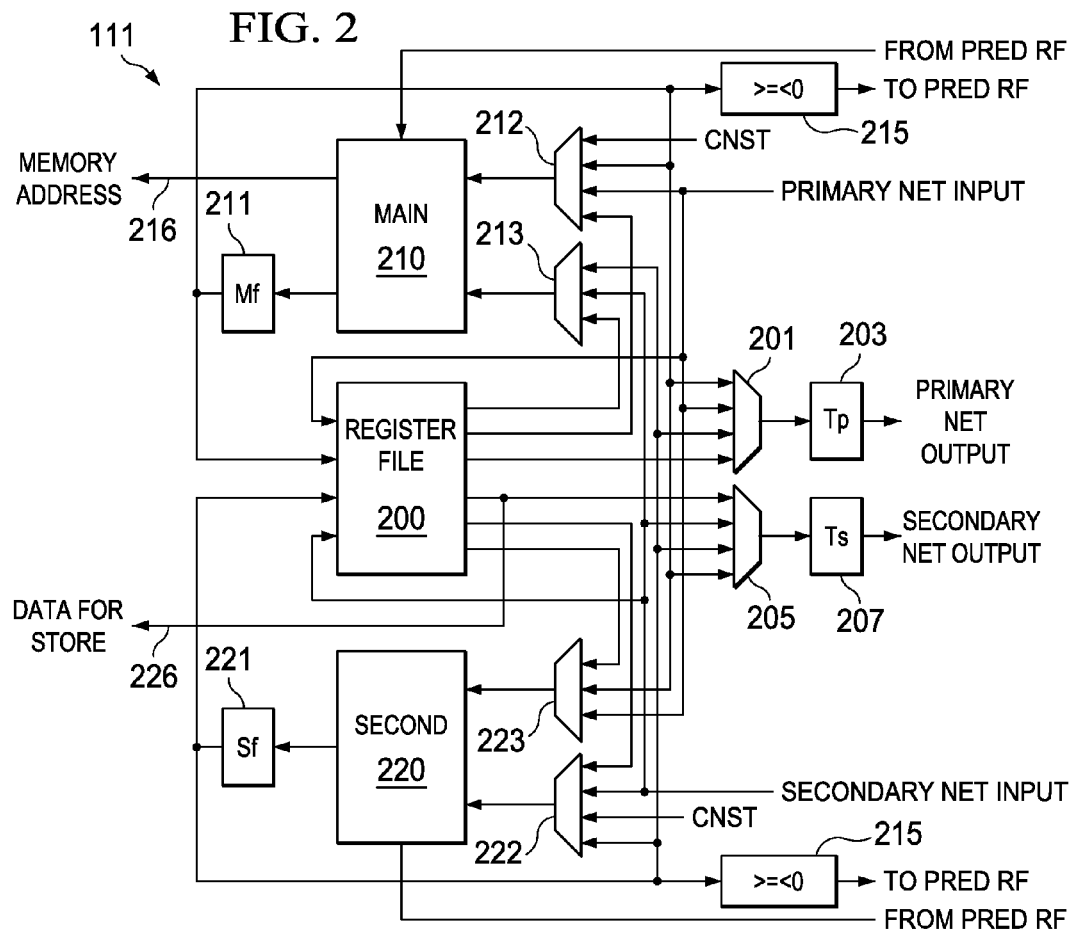
FIG. 2 illustrates a representative sub-cluster of the data processor of FIG. 1.

FIG. 2 illustrates a simplified block diagram of the hardware of data left sub-cluster 111 as a representative sub-cluster. FIG. 2 includes register file 200 with 6 read ports and 4 write ports, and functional units M 210 and S 220. Register file 200 in each sub-cluster includes 24 64-bit registers. These registers can also be accessed as register pairs for a total of 128-bits. The data path width of the functional units is 128 bits allowing maximum computational bandwidth using register pairs.

Main functional unit 210 includes one output to forwarding register Mf 211 and two operand inputs driven by respective multiplexers 212 and 213. Main functional unit 210 of representative sub-cluster 111 is preferably a memory address calculation unit having an additional memory address output 216. Functional unit 210 receives an input from an instruction designated predicate register to control whether the instruction results abort. The result of the computation of main functional unit 210 is always stored in forwarding register Mf 210 during the buffer operation 813 (further explained below). During the next pipeline phase forwarding register Mf 210 supplies its data to one or more of: an write port register file 200; first input multiplexer 212; comparison unit 215; primary net output multiplexer 201; secondary net output multiplexer 205; and input multiplexer 223 of secondary functional unit 220. The destination or destinations of data stored in forwarding register Mf 211 depends upon the instruction.

First input multiplexer 212 selects one of four inputs for the first operand src1 of main functional unit 210 depending on the instruction. A first input is instruction specified constant cnst. As described above in conjunction with the instruction coding illustrated in FIGS. 5 and 6, the second and third operand fields of the instruction can specify a 5-bit constant. This 5-bit instruction specified constant may be zero filled or sign filled to the 64-bit operand width. A second input is the contents of forwarding register Mf 211. A third input is data from the primary net input. The use of this input will be further described below. A fourth input is from an instruction specified register in register file 200 via one of the 6 read ports.

Second input multiplexer 213 selects one of three inputs for the second operand src2 of main functional unit 210 depending on the instruction. A first input is the contents of forwarding register Sf 221 connected to secondary functional unit 220. A second input is data from the secondary net input. The use of this input will be further described below. A third input is from an instruction specified register in register file 200 via one of the 6 read ports.

Secondary functional unit 220 includes one output to forwarding register Sf 221 and two operand inputs driven by respective multiplexers 222 and 223. Secondary functional unit 220 is similarly connected as main functional unit 210. Functional unit 220 receives an input from an instruction designated predicate register to control whether the instruction results aborts. The result of the computation of secondary functional unit 220 is always stored in forwarding register Sf 221 during the buffer operation 813. Forwarding register Sf 221 supplies its data to one or more of: a write port register file 200; first input multiplexer 222; comparison unit 225; primary net output multiplexer 201; secondary net output multiplexer 205; and input multiplexer 213 of main functional unit 210. The destination or destinations of data stored in forwarding register Sf 221 depends upon the instruction.

First input multiplexer 222 selects one of four inputs for the first operand src1 of main functional unit 210 depending on the instruction: the instruction specified constant cnst; forwarding register Sf 221; secondary net input; and an instruction specified register in register file 200 via one of the 6 read ports. Second input multiplexer 213 selects one of three inputs for the second operand src2 of secondary functional unit 220 depending on the instruction: forwarding register Mf 211 of main functional unit 210; primary net input; and an instruction specified register in register file 200 via one of the 6 read ports.

FIG. 2 illustrates connections between representative sub-cluster 111 and the corresponding transport switch 119. Multiplexer 212 can select data from the primary net input for the first operand of main functional unit 210. Similarly multiplexer 223 can select data from the primary net input for the second operand of secondary functional unit 220. Multiplexer 213 can select data from the secondary net input for the second operand of main functional unit 210. Similarly multiplexer 222 can select data from the secondary net input for the first operand of secondary functional unit 220.

Representative sub-cluster 111 can supply data to the primary network and the secondary network. Primary output multiplexer 201 selects the data supplied to primary transport register 203. A first input is from forwarding register Mf 211.

A second input is from the primary net input. A third input is from forwarding register 221. A fourth input is from register file 200. Secondary output multiplexer 205 selects the data supplied to secondary transport register 207. A first input is from register file 200. A second input is from the secondary net input. A third input is from forwarding register 221. A fourth input is from forwarding register Mf 211.

Figure 3:
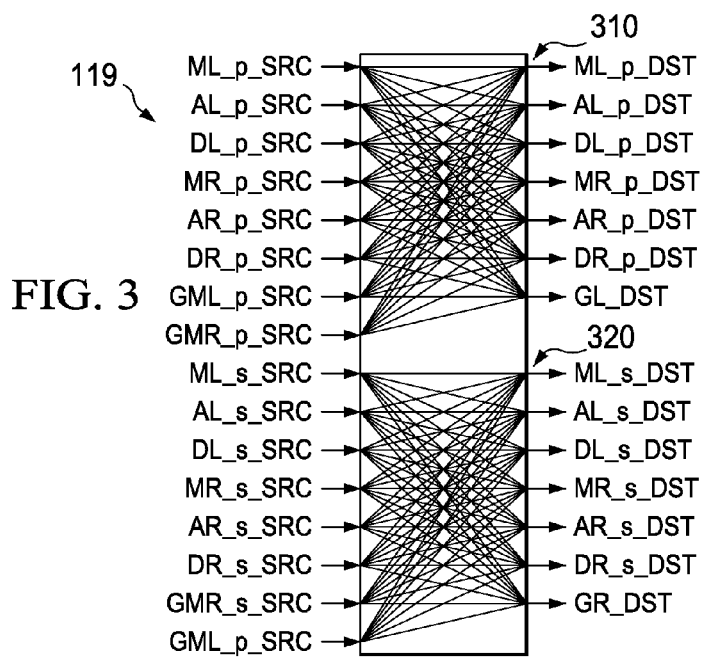
FIG. 3 illustrates the connectivity of a representative transport switch of the data processor of FIG. 1.

Sub-cluster 111 can separately send or receive primary net data or secondary net data via corresponding transport switch 119. FIG. 3 schematically illustrates the operation of transport switch. Transport switches 129, 139 and 149 operate similarly. Transport switch 119 has no storage elements and is purely a way to move data from one sub-cluster register file to another. Transport switch 119 includes two networks, primary network 310 and secondary network 320. Each of these networks is a set of seven 8-to-1 multiplexers. This is shown schematically in FIG. 3. Each multiplexer selects only a single input for supply to its output. Scheduling constraints in the complier will enforce this limitation. Each multiplexer in primary network 310 receives inputs from the primary network outputs of: math M left functional unit; math A left functional unit; data left functional unit; math M right functional unit; math A right functional unit; data right functional unit; global register left; and global register right. The seven multiplexers of primary network 310 supply data to the primary network inputs of: math M left functional unit; math A left functional unit; data left functional unit; math M right functional unit; math A right functional unit; data right functional unit; and global register left. Each multiplexer in primary network 320 receives inputs from the secondary network outputs of: math M left functional unit; math A left functional unit; data left functional unit; math M right functional unit; math A right functional unit; data right functional unit; global register left; and global register right. The seven multiplexers of secondary network 320 supply data to the secondary network inputs of: math M left functional unit; math A left functional unit; data left functional unit; math M right functional unit; math A right functional unit; data right functional unit; and global register right. Note that only primary network 310 can communicate to the global register left and only secondary network 320 communicates with global register right.

The data movement across transport switch 119 is via special move instructions. These move instructions specify a local register destination and a distant register source. Each sub-cluster can communicate with the register file of any other sub-cluster within the same cluster. Moves between sub-clusters of differing clusters require two stages. The first stage is a write to either left global register or to right global register. The second stage is a transfer from the global register to the destination sub-cluster. The global register files are actually duplicated per cluster. As show below, only global register moves can write to the global clusters. It is the programmer's responsibility to keep data coherent between clusters if this is necessary. Table 2 shows the type of such move instructions in the preferred embodiment.

TABLE 2

| Instruction | Operation |
| --- | --- |
| MVD | Transfer 64-bit data register through transport switch sub-cluster to sub-cluster or global register to sub-cluster |
| MVQ | Transfer 128-bit register pair through transport switch sub-cluster to sub-cluster or global register to sub-cluster |

TABLE 2-continued

| Instruction | Operation |
| --- | --- |
| MVQD | Extract 64 bits from 128-bit register pair and transfer sub-cluster to sub-cluster or global register to sub-cluster |
| MVPQ | Transfer 128 bits of the predicate register file through crossbar sub-cluster to sub-cluster |
| MVPD | Transfer 16-bit value from 1 predicate register file to a 64-bit data register |
| MVDP | Transfer 16-bit value from a 64-bit data register file to a 16-bit predicate register |
| MVP | Transfer a specific predicate register into the move network sub-cluster to sub-cluster or global register file to sub-cluster, zero extend the upper 48 bits of the register |
| GMVD | Transfer 64-bit register from a sub-cluster to the global register file |
| GMVQ | Transfer 128-bit register pair from a sub-cluster to the global register file |
| GMVQD | Extract 64-bits from 128 bit register pair and transfer sub-cluster to global register file |

FIG. 4 illustrates the pipeline stages 400 of data processor 100. These pipeline stages are divided into three groups: fetch group 410; decode group 420; and execute group 430. All instructions in the instruction set flow through the fetch, decode, and execute stages of the pipeline. Fetch group 410 has three phases for all instructions, and decode group 420 has five phases for all instructions. Execute group 430 requires a varying number of phases depending on the type of instruction.

The fetch phases of the fetch group 410 are: program address send phase 411 (PS); bank number decode phase 412 (BN); and program fetch packet return stage 413 (PR). Data processor 100 can fetch a fetch packet (FP) of eight instructions per cycle per cluster. All eight instructions for a cluster proceed through fetch group 410 together. During PS phase 411, the program address is sent to memory. During BN phase 413, the bank number is decoded and the program memory address is applied to the selected bank. Finally during PR phase 413, the fetch packet is received at the cluster.

The decode phases of decode group 420 are: decode phase D1 421; decode phase D2 422; decode phase D3 423; decode phase D4 424; and decode phase D5 425. Decode phase D1 421 determines valid instructions in the fetch packet for that cycle by parsing the instruction P bits. Execute packets consist of one or more instructions which are coded via the P bit to execute in parallel. This will be further explained below. Decode phase D2 422 sorts the instructions by their destination functional units. Decode phase D3 423 sends the predecoded instructions to the destination functional units. Decode phase D3 423 also inserts NOPS if these is no instruction for the current cycle. Decode phases D4 424 and D5 425 decode the instruction at the functional unit prior to execute phase E1 431.

The execute phases of the execute group 430 are: execute phase E1 431; execute phase E2 432; execute phase E3 433; execute phase E4 434; execute phase E5 435; execute phase E6 436; execute phase E7 437; and execute phase E8 438. Different types of instructions require different numbers of these phases to complete. Most basic arithmetic instructions such as 8, 16 or 32 bit adds and logical or shift operations complete during execute phase E1 431. Extended precision arithmetic such as 64 bits arithmetic complete during execute phase E2 432. Basic multiply operations and finite field operations complete during execute phase E3 433. Local load and store operations complete during execute phase E4 434. Advanced multiply operations complete during execute phase E6 436. Global loads and stores complete during execute phase E7 437. Branch operations complete during execute phase E8 438.

FIG. 5 illustrates an example of the instruction coding of instructions used by data processor 100. This instruction coding is generally used for most operations except moves. Data processor 100 uses a 40-bit instruction. Each instruction controls the operation of one of the functional units. The bit fields are defined as follows.

The S bit (bit 39) designates the cluster left or right side. If S=0, then the left side is selected. This limits the functional unit to sub-clusters 111, 113, 115, 121, 123, 125, 131, 133, 135, 141, 143 and 145. If S=1, then the right side is selected. This limits the functional unit to sub-clusters 112, 114, 116, 122, 124, 126, 132, 134, 136, 142, 144 and 146.

The unit vector field (bits 38 to 35) designates the functional unit to which the instruction is directed. Table 3 shows the coding for this field.

TABLE 3

| Vector | I Slot | Functional Unit |
|---|---|---|
| 00000 | DLM | Data left main unit |
| 00001 | DLS | Data left secondary unit |
| 00010 | DLTm | Global left memory access |
| 00011 | DLTp | Data left transport primary |
| 00100 | DLTs | Data left transport secondary |
| 00101 | ALM | A math left main unit |
| 00110 | ALS | A math main left secondary unit |
| 00111 | ALTm | A math local left memory access |
| 01000 | ALTp | A math left transport primary |
| 01001 | ALTs | A math left transport secondary |
| 01010 | MLM | M math left main unit |
| 01011 | MLS | M math left secondary unit |
| 01100 | MLTm | M math local left memory access |
| 01101 | MLTp | M math left transport primary |
| 01110 | MLTs | M math left transport secondary |
| 01111 | C | Control Slot for left side |
| 10000 | DRM | Data right main unit |
| 10001 | DRS | Data right secondary unit |
| 10010 | DRTm | Global right memory access |
| 10011 | DRTp | Data right transport primary |
| 10100 | DRTs | Data right transport secondary |
| 10101 | ARM | A math right main unit |
| 10110 | ARS | A math main right secondary unit |
| 10111 | ARTm | A math local right memory access |
| 11000 | ARTp | A math right transport primary |
| 11001 | ARTs | A math right transport secondary |
| 11010 | MRM | M math right main unit |
| 11011 | MRS | M math right secondary unit |
| 11100 | MRTm | M math local right memory access |
| 11101 | MRTp | M math right transport primary |
| 11110 | MRTs | M math right transport secondary |
| 11111 | C | Control Slot for right side |

The P bit (bit 34) marks the execute packets. The p-bit determines whether the instruction executes in parallel with the following instruction. The P bits are scanned from lower to higher address. If P=1 for the current instruction, then the next instruction executes in parallel with the current instruction. If P=0 for the current instruction, then the next instruction executes in the cycle after the current instruction. All instructions executing in parallel constitute an execute packet. An execute packet can contain up to eight instructions. Each instruction in an execute packet must use a different functional unit.

The K bit (bit 33) controls whether the functional unit result is written into the destination register in the corresponding register file. If K=0, the result is not written into the destination register. This result is held only in the corresponding forwarding register. If K=1, the result is written into the destination register.

The Z field (bit 32) controls the sense of predicated operation. If Z=1, then predicated operation is normal. If Z=0, then the sense of predicated operation control is inverted.

The Pred field (bits 31 to 29) holds a predicate register number. Each instruction is conditional upon the state of the designated predicate register. Each sub-cluster has its own predication register file. Each predicate register file contains 7 registers with writable variable contents and an eight register hard coded to all 1. This eighth register can be specified to make the instruction unconditional as its state is always known. As indicated above, the sense of the predication decision is set the state of the Z bit. The 7 writable predicate registers are controlled by a set of special compare instructions. Each predicate register is 16 bits. The compare instructions compare two registers and generate a true/false indicator of an instruction specified compare operation. These compare operations include: less than; greater than; less than or equal to; greater than or equal to; and equal to. These compare operations specify a word size and granularity. These include scalar compares which operate on the whole operand data and vector compares operating on sections of 64 bits, 32 bits, 16 bits and 8 bits. The 16-bit size of the predicate registers permits storing 16 SIMD compares for 8-bit data packed in 128-bit operands. Table 4 shows example compare results and the predicate register data loaded for various combinations.

TABLE 4

| Type | Compare Results | Stored in Predicate Register |
|---|---|---|
| 1H scalar | 0x00000000:0000FFFF | 1111111111111111 |
| 4H vector | 0x0000FFFF:0000FFFF | 0000000000110011 |
| 8H vector | 0x0000FFFF:0000FFFF :0000FFFF:0000FFFF | 0001101100110011 |
| 1W scalar | 0x00000000:FFFFFFFF | 1111111111111111 |
| 2W vector | 0x00000000:FFFFFFFF | 0000000000001111 |
| 4W vector | 0x00000000:FFFFFFFF :00000000:FFFFFFFF | 0000111100001111 |
| 1D scalar | 0xFFFFFFFF:FFFFFFFF | 1111111111111111 |
| 2D vector | 0xFFFFFFFF:FFFFFFFF :00000000:00000000 | 1111111100000000 |
| 8B vector | 0x00FF00FF:00FF00FF | 0000000001010101 |
| 16B vector | 0x00FF00FF:00FF00FF:0 0FF00FF:00FF00FF | 0101010101010101 |

The DST field (bits 28 to 24) specifies one of the 24 registers in the corresponding register file or a control register as the destination of the instruction results.

The OPT3 field (bits 23 to 19) specifies one of the 24 registers in the corresponding register file or a 5-bit constant as the third source operand.

The OPT2 field (bits 18 to 14) specifies one of the 24 registers in the corresponding register file or a 5-bit constant as the second source operand.

The OPT1 field (bits 13 to 9) specifies one of the 24 registers of the corresponding register file or a control register as the first operand.

The V bit (bit 8) indicates whether the instruction is a vector (SIMD) predicated instruction. This will be further explained below.

The opcode field (bits 7 to 0) specifies the type of instruction and designates appropriate instruction options. A detailed explanation of this field is beyond the scope of this invention except for the instruction options detailed below.

FIG. 6 illustrates a second instruction coding generally used for data move operations. These move operations permit data movement between sub-clusters within a cluster and also between sub-clusters of differing clusters. This second instruction type is the same as the first instruction type illustrated in FIG. 5 except for the operand specifications. The three 5-bit operand fields and the V bit are re-arranged into four 4-bit operand fields. The OP2 sub-cluster ID field (bits 23 to 20) specifies the identity of another cluster as the source of a second operand. The OP2 field (bits 19 to 16) specifies a register number for the second operand. The OP1 sub-cluster ID field (bits 15 to 12) specifies the identity of another cluster as the source of a first operand. The OP1 field (bits 11 to 8) specifies a register number for the first operand. All other fields are coded identically to corresponding fields described in conjunction with FIG. 5.

Register file bypass or register forwarding is a technique to increase the speed of a processor by balancing the ratio of clock period spent reading and writing the register file while increasing the time available for performing the function in each clock cycle. This invention will be described in conjunction with the background art.

The normal prior art method reads every intermediate value from the register file and writes every result into the register file. This simple approach puts the expensive register file read and write operations in the critical path. The amount of time allowed to perform the functional unit operation decreases and so the clock speed may need to decrease to accommodate the functional unit operation. Increasing the clock speed makes the power increase and removes design frequency margin. The approach is notionally simple but costly in speed of operation.

FIG. 7 illustrates the sequence of an execution phase operational cycle within a functional unit of a data processor according to this aspect of the prior art for two instructions 710 and 720. Note this example is of a single cycle instruction requiring only execution phase E1 431 for completion. Each operational cycle 710 includes three parts. During part 711 of instruction 710, central processing unit 1 reads data from the corresponding register file 200 and delivers this data to main functional unit 210 or secondary functional unit 220. The instruction determines the register or registers accessed. According to the instruction type illustrated in FIG. 5, each instruction specifies two source registers OP1 and OP2 and an optional third source operand register OP3. During part 712, the functional unit performs the data processing operation specified by the instruction. This operation generates data results. During part 713, central processing unit writes the data results into the corresponding register file 200 in the destination register specified by the instruction. Instruction 720 includes similar operations in register file read part 721, functional unit operation part 722 and register file write part 723.

This sequence of operation has an important advantage. This sequence of operation enables the data results from one instruction to be available for use in the next sequentially executed instruction in the same sub-cluster. Thus the results of instruction 710 are available for use as operands in instruction 720. This feature is convenient for programming because no special precautions are needed for such consecutive operations.

This sequence of operational parts within execution phase E1 431 may not be ideal for speed of operation. This execution phase is often the most lengthy of the pipelined operations of the instruction. Since at least one instruction is operating on an execution phase during each operational cycle, this length limits the maximum speed of operation of central processing unit 1. One method of speeding up operation during this critical execution phase is dividing the register operations and the functional unit operations into differing execution phases. It is generally found that the sum of the register file read time and the register file write time is about the same as the functional unit operation time. These operations are mutually exclusive so could be performed concurrently.

Figure 8:
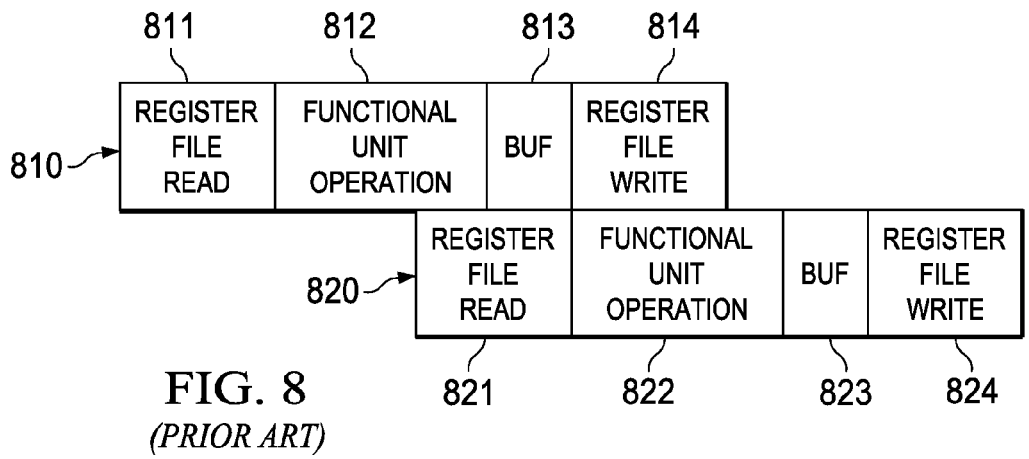
FIG. 8 illustrates the sequence of an execution phase operational cycle within a functional unit of a data processors according to an alternative aspect of the prior art using register bypassing.

FIG. 8 illustrates the sequence of an execution phase operational cycle within a functional unit of the VLIW data processing apparatus according to this alternative embodiment of the prior art. Instruction 810 includes register file read 811, functional unit operation 812, buffer operation 813 which will be further explained below and register file write 814. These operational parts are divided as follows: read register file 811 is at the end of decode phase DC 425; functional unit operation 812 and buffer operation 813 are included in execution phase E1 431; and register file write 814 is the beginning of execution phase E2 432. Instruction 820 similarly includes register file read 821, functional unit operation 822, buffer operation 823 and register file write 824. This arrangement of operational elements allows the pipeline phase to be shortened to either the sum of functional unit operation 812 and buffer operation 813 or the longer of any other pipeline phase. This change thus could permit speeding of operation of central processing unit 1 without requiring redesign to speed any components.

This pipeline design has a problem relative to the operation illustrated in FIG. 7. The result of instruction 810 is not available for use as an operand in instruction 820. Note that register file write 814 occurs after register file read 821. Thus register file read 821 would read the prior state of the corresponding register which would not correspond to results from instruction 810 scheduled to be written to that register. On method of dealing with this problem is to require at least one instruction between any instruction requiring results from a prior instruction. This solution produces programming difficulties and may limit the amount of instruction level parallelism achievable by central processing unit 1.

In code example 1, the result stored in register L12 of instruction 1 is used in instruction 2.

| Inst 1 | ADD L10, L11, L12 |
| Inst 2 | ADD L12, L13, L14 |

CODE EXAMPLE 1

This instruction sequence is permitted when operating according to FIG. 7. This instructions sequence is prohibited when operating according to FIG. 8 because the sum of instruction 1 is not stored in register L12 before instruction 2 reads this register to obtain its operand. Code example 2 shows the insert of another instruction between the calculation instruction and the use instruction.

| Inst 1 | ADD L10, L11, L12 |
| Inst 2 | ADD L8, L9, L10 |
| Inst 3 | ADD L12, L13, L14 |

CODE EXAMPLE 2

In code example 2, instruction 1 writes the sum into register L12. Instruction 2 does not reference this register. Instruction 3 may use the results of instruction 1 stored in register L12 because intervening instruction 2 provided enough time for this result to be written into and read from the register file.

Figure 9:
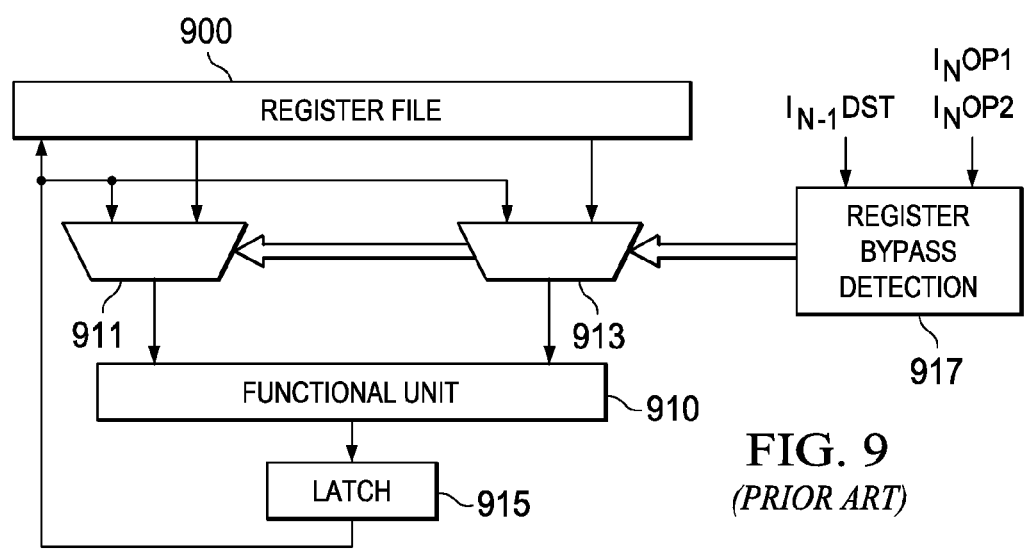
FIG. 9 illustrates a simplified block diagram of the hardware required for register bypassing (prior art)

Another prior art technique used to solve this problem is called register bypassing or register forwarding. FIG. 9 illustrates a simplified block diagram of the prior art register bypass solution to this problem. Register file 900 represents the corresponding register file 200 illustrated in FIG. 2. Functional unit 910 is one of the functional units of the corresponding sub-cluster. Functional unit 910 operates according to the sequence of FIG. 8. The result of functional unit 910 for instruction 810 is stored in latch 915 during buffer operation 813. Upon the next pipeline phase this result stored in latch 915 supplies the register file write 814. The result stored in latch 915 also supplies one input of multiplexer 911 and of multiplexer 913. Each multiplexer 911 and 913 receives an input from register file 900. Multiplexer 911 receives the data stored in the first source register OP1 of the instruction. Multiplexer 913 receives the data stored in the second source register OP2 of the instruction. Register bypass detection 917 controls selection of multiplexers 911 and 913. Register bypass detection 917 receives the identity of the source registers OP1 and OP2 ($I_N$OP1, $I_N$OP2) of the current instruction and the identity of the destination register DST ($I_{N-1}$DST) of the immediate past instruction. It is conventional to reference registers within register file 900 by register number. If the prior instruction destination register $I_{N-1}$dst does not match either current instruction source registers $I_N$src1 or $I_N$src2, then register bypass detection 917 controls multiplexers 911 and 913 to select the output from register file 900 for the corresponding operand supplied to functional unit 910. If the prior instruction destination register $I_{N-1}$dst matches current instruction source register $I_N$src1, then register bypass detection 917 controls multiplexer 911 to select the output from latch 915 for the first operand supplied to functional unit 910. Similarly if the prior instruction destination register $I_{N-1}$dst matches current instruction source register $I_N$src2, then register bypass detection 917 controls multiplexer 913 to select the output from latch 915 for the second operand supplied to functional unit 910. Obtaining the prior instruction result from latch 915 bypasses the register file write/register file read cycle. This saves enough time so that the results of the immediately prior instruction can be used in the current instruction.

Register bypassing thus forwards the required value directly to any functional unit needing it. Register bypass detection 917 inspects the operand stream during decode to determine which forwarding multiplexes are needed. The register file write occurs in every case so that if the data is needed in the future it is available in the register file. In code example 1, the value to be read in instruction 2 from register L12 is predetermined in earlier. Rather than reading register L12, the value is read from latch 915 that was written at the end of instruction 1.

Register bypassing creates problems not immediately obvious from the simplified drawing of FIG. 9. To avoid programming limitations such as described above with code examples 1 and 2, the comparison must be made for each input operand of each functional unit and for each functional unit. For central processing unit 1 illustrated in FIG. 2, each functional unit L1 unit 22, S1 unit 23, M1 unit 24, D1 unit 25, L2 unit 32, S2 unit 33, M2 unit 34 and D2 unit 35 requires two multiplexers. Each of these multiplexers requires at least three inputs, one for the register file output and one for each output of the functional units in the corresponding sub-cluster. Register bypass detection 917 must compare eight input operand register numbers with each of four destination operand register numbers. If the number of register file write ports is W and the number of register file read ports is R, then the comparison network must make R×W compares. Assuming that each of N functional units has two input operands and a single output, then R=2N and W=N. The number of comparisons thus increases with the square of the number of functional units (R×W=2N×N=2N$^2$). For large numbers of functional units this solution is not scalable.

There is a further complication using this prior art technique. As described in conjunction with FIG. 4, some instructions have longer latency, finishing at later execute pipeline phases E2, E3, E4 or E5. The comparison network must be aware of the latency of each instruction to make the proper comparison. Instruction predication as described above must also be controlled by the forwarding logic to ensure proper operation.

This invention concerns the problem of this great amount of required hardware to support register bypassing. This invention further utilizes an aspect of the intermediate data. Conventionally, even using register bypassing, the result of a function unit computation is always written to the register file always. Each operation always reads its operands from the register file. Inspection of actual code examples reveals that 40% to 50% of the time an intermediate result is used once in the immediately following instruction and may never read again. This fact causes extra pressure on the register file contents because registers are used for such short times.

A first embodiment of this invention employs the instruction kill bit as described above in conjunction with FIG. 5. Detection of the need for register file bypassing occurs as in the prior art as described in conjunction with FIG. 9. During the decode group 420 any register file conflicts are detected. This detection operates in conjunction with knowledge of the instruction latency of the instruction generating the operand used by the later instruction. Detection for register file bypassing occurs only if the generating instruction produces the operand during the pipeline phase immediately before use in the execute phase E1 of the consuming instruction. If the generating instruction precedes the consuming instruction by enough to permit the operand to be written to and read from the register file, then no register bypass is needed. If an instruction writes to a register within the register file taking into account the execution latency during a pipeline phase following the execute phase E1 431 of the consuming instruction, then no register bypassing takes place. This situation is considered normal register reuse. Because the operation of the plural functional units is statically encoded in the VLIW instruction stream, there will be ample opportunity to make this register file detection.

This embodiment differs from the prior art in that the computed result is not always written into the register file. As noted above the bit state of the instruction Kill bit determines whether the result is stored in the register file in the instruction specified destination register. Over a wide variety of benchmarks a majority of register lifetimes is either 1 or 2 cycles. If the register value could be kept in flight for those 1 or 2 cycles the value would never need to be written to the register file. This saves a large number of register file ports and registers. Analysis shows that selectively using a forwarding register for 1 and 2 cycle register file bypass saves on average 12% of the registers required and about 50% of the register ports needed. When a value is bypassed it does not need to be written to the register file and if it comes from a forwarding multiplexer it does not need to activate a register file read port. Thus this communication is free from the viewpoint of the register file. This approach could be used to reduce the number of registers and active read ports. Alternatively, this technique permits more intensive use of a given number of register and read ports.

FIGS. 10 to 14 show examples of the use of selective register file write kill. FIG. 10 illustrates an example where the write W occurs before the read R and no other read takes place. In FIG. 10 the register is active for six cycles between write and read. This interval is too long to be held in forwarding registers. Therefore this register write is not killed. In FIG. 11 the register data is used the next cycle. This is a good candidate for register write kill as shown. In FIG. 12 the register data is used in the second following cycle. This is not a good candidate for register bypass or for register write kill. The data is written to the destination register normally and recalled by the consuming instruction. In FIG. 13 the register data is used in both the immediately following cycle and in the next cycle. This case requires register file bypassing for the first read. The register write is not killed so that the operand will be available to be read for the second consuming instruction. FIG. 14 illustrates a similar case. The data must be stored in the destination register to be available for the second consuming instruction. The number of times that the data is needed in the next following cycle and never accessed again is frequent enough that the register write kill provides an advantage.

The kill operation is modified in the preferred embodiment for register pair instructions. This modification enables killing either or both the register writes. The modification depends upon the least significant bit of the operand. This modification is shown in Table 5

TABLE 5

| Register Write Type | K bit | LSB of Operand | Action |
| --- | --- | --- | --- |
| Single | 0 | X | Do not write |
| Single | 1 | X | Write |
| Double | 0 | 0 | Do not write either register |
| Double | 0 | 1 | Write odd register |
| Double | 1 | 0 | Write even register |
| Double | 1 | 1 | Write both registers |

A second embodiment of this invention employs explicit register file bypass. In this embodiment the instruction indicates whether register file bypassing is needed to supply an operand to the next instruction. By thus exposing the pipeline, the decision to forward an operand or write to the register file or both is made at statically at compile time. This invention requires a less complex bypass scheme but creates some areas where the program flow cannot be interrupted. The following are examples of required behavior.

| Inst 1 | ADD | L10, L12, L11 |
| --- | --- | --- |
| Inst 2 | ADD | L11, L10, L13; L11 needs forwarding |
| Inst 3 | ... | |
| Inst 4 | ... | |
| Inst 5 | ADD | L11, L12, L14; L11 read from Rf |

CODE EXAMPLE 3

Code example 3 is a native instruction sequence. In code example 3 the operation of instructions 3 and 4 does not matter to the register bypass operations. It can be seen that the results of instruction 1 to be stored in register L11 should be forwarded to the input of instruction 2. Instruction 5 can read this data from register L11 because enough time will have elapsed for the write of instruction 1 to complete before the operand read of instruction 5. Code example 4 shows this same instruction sequence in explicitly forwarded form.

| Inst 1 | ADD | L10, L12, L11 (,FALS); always written |
| --- | --- | --- |
| Inst 2 | ADD | L11, L10, L13; read ALS forward reg |
| Inst 3 | ... | |
| Inst 4 | ... | |
| Inst 5 | ADD | L11, L12, L14; L11 read from Rf |

CODE EXAMPLE 4

In this example simple code modifications permit the instructions to address the forward register explicitly. Instruction 1 always writes to both the forwarding register ASL and the register L11. Instruction 2 explicitly reads an operand from the forwarding register ALS. Since it is certain that the register file data write of instruction 1 completes into register L11 before the register file read of instruction 5, instruction 5 requires no modification.

Table 6 shows the register file addresses (register numbers) use in this invention. In the example register file 900 includes 16 general purpose registers and four forwarding registers.

TABLE 6

| Register | Operand Code |
| --- | --- |
| L0 | 00000 |
| L1 | 00001 |
| L2 | 00010 |
| L3 | 00011 |
| L4 | 00100 |
| L5 | 00101 |
| L6 | 00110 |
| L7 | 00111 |
| L8 | 01000 |
| L9 | 01001 |
| L10 | 01010 |
| L11 | 01011 |
| L12 | 01100 |
| L13 | 01101 |
| L14 | 01110 |
| L15 | 01111 |
| Unused | 10000 to 10111 |
| Rfs | 11000 |
| Rfp | 11001 |
| Mf | 11010 |
| Sf | 11011 |
| Unused | 11100 to 11111 |

For the reads from register file 900 the operand codes are accessed as shown in Table 6. The result is always written into the corresponding forwarding register. A destination register number of 00000 to 01111 writes into the corresponding data register L0 to L15. A destination register number of 10000 or greater does not write into register file 900.

Consider code example 5 specifying virtual registers.

| | |
|---|---|
| Inst 1 | ADD v0, v1, v2 |
| Inst 2 | ADD v2, v3, v4 |
| Inst 3 | ADD v2, v7, v10 |

CODE EXAMPLE 5

This invention would allocate registers to this instruction sequence as follows in code example 5

| |
|---|
| ADD L0, L1, L2 (LF implicitly written) |
| ADD LF, L3, L4 |
| ADD L2, L7, L10 |

CODE EXAMPLE 6

In instruction 1 the write to register L2 is to register number 00010. This forces a write to register L2 in register file 900. The functional unit always writes to the corresponding forwarding register, here designated as LF. Decode hardware detects if the register number is one of the register file addresses, that is the specified register number is 00000 to 01111. Instruction 2 explicitly specifies the LF register as the first source operand using the corresponding register number greater than 10000 as shown in Table 6. Thus this instruction operates in the same manner as the prior art except that the forwarding register LF can be explicitly noted as the source operand.

This value in each forwarding register remains the same until overwritten by a following instruction of the corresponding functional unit. Thus forwarding registers is sticky and as long as it is not overwritten it can used as an intermediate store. This forwarding value is volatile and can be used to hold all values that have a life time single cycle life time. Experiments show that between 20% and 80% of all intermediate values have such a single cycle life time. Thus using these forwarding registers can free register file space to hold more values that have longer than a single cycle. Because these forwarding registers require fewer write and read ports, they store data using less power than required by registers in a register file. Note further that for values with a life time longer than a single cycle that are written to the register file, the first cycle of the lifetime is truncated by the storage in the forwarding register. Thus register storage duration is one cycle shorter. This allows greater freedom in register allocation and may permit packing more variables in the register file.

This explicit register file pass technique may cause problems with correct behavior in response to interrupts, operation with predication and correct operation with register pair instructions.

Interrupts could come at any time. Such interrupts must be handled in an exposed pipelined processor to enable outstanding instructions to complete their pipelines. In normal exposed pipelines, there are typically multiple allocations for subsequent registers in time. This is known as single assignment code.

| | |
|---|---|
| Inst 1 | MPY L0, L1, L2 |
| Inst 2 | MPY L0, L1, L2 |
| Inst 3 | MPY L0, L1, L2 |
| Inst 4 | ADD L2, L3, L3 |
| Inst 5 | ADD L2, L3, L3 |
| Inst 6 | ADD L2, L3, L3 |

CODE EXAMPLE 7

In code example 7 the multiply instructions MPY have a 2 cycle pipeline latency. This means that the MPY instructions complete in E3 phase 433. Upon an interrupt L2 will be added into L3 but the subsequent L2 will overwrite the previous outstanding one. The solutions to this problem with explicit forwarding are:

Only allow interrupts inside software pipelined loops (SPLOOPs). In this case the whole pipeline will complete before another begins and so no collisions can occur. Care must be taken to make sure values that are live around loop boundaries are allocated to their own unique register file register.

| | |
|---|---|
| Inst 1 | MPY L0, L1, LFm |
| Inst 2 | MPY L0, L1, LFm |
| Inst 3 | MPY L0, L1, LFm |
| Inst 4 | ADD LFm, LFa, LFa |
| Inst 5 | ADD LFm, LFa, Lfa |
| Inst 6 | ADD LFm, LFa, Lfa |

CODE EXAMPLE 8

In a normal code sequence this code would need to be rewritten and allow explicit bypass registers to empty. This is shown in code example 9.

| | | |
|---|---|---|
| Inst 1 | MPY | L1, L1, L2 |
| Inst 2 | MPY | L0, L1, L3 |
| Inst 3 | MPY | L0, L1, L4 |
| Inst 4 | NOP | |
| ;cycle to allow value to be written into register file | | |
| Inst 5 | ADD | L2, LFa, LFa |
| ;single cycle operations don't need single assignment | | |
| Inst 6 | ADD | L3, LFa, LFa |
| Inst 7 | ADD | L4, LFa, LFa |

CODE EXAMPLE 9

Thus explicit forwarding requires a cycle extra to allow the forwarding register to be written to the register file to allow storage. This register file storage option is on every instruction. For maximum performance the code cannot be interruptable but the small overhead to allow interruptability is acceptable.

The preferred embodiment of this invention uses supports predicated instructions. The preferred embodiment of this invention uses a separate predication register file rather than using general purpose registers as described above. This predication register file is an extra set of registers that store whether a result is true or not. The preferred embodiment stores 16 predicate values per data path/cluster. The preferred embodiment of this invention includes instructions that explicitly write to an instruction specified one of the predication registers. This instruction reads the forwarding register of the previous instruction. This instruction makes the comparison specified in the instruction and writes a one bit result into the predication register. There is a delay slot on the predication before the predicate register can be used.

Code example 10 is a simple down counter such as used in a software loop in the prior art digital signal processor as described in conjunction with FIGS. 1 to 4. The register A0 stores the count and serves as the predicate register.

| Inst 1 | [!A0] | SUB A0, 1, A0 |
|---|---|---|

CODE EXAMPLE 10

The symbol "[!A0]" indicates: the instruction is predicated on the value stored in register A0; and the "!" symbol indicates that z=1 in instruction 1, thus testing for equality with zero. Instruction 1 executes and decrements the count in register A0 until the count reaches zero. Code example 11 shows a similar operation using the preferred embodiment of this invention.

| Inst 1 | [!p0] | SUB | L0, 1, L0 |
|---|---|---|---|
| Inst 2 | | CMPNEQZ | L0, p0; Is L0 != 0? |
| Inst 3 | | ... | |

CODE EXAMPLE 11

In the preferred embodiment of this invention predicate values are stored in a separate register file from the general purpose register file. This saves register file space for other intermediate values. Note that each predicate value is a single bit. Thus providing 16 or 32 predication values requires no more circuits than a single register in a register file. Storing a single bit predicate value in a 32-bit register is not a good use of the circuits or the integrated circuit area needed to embody the circuits. In code example 11, instruction 1 performs the predicated decrement of a count stored in register L0. Instruction 2 compares the value in the forwarding register with zero and sends the one bit true/false result to predication register p0. Other comparison instructions produce true/false results of a test for less than 0 and a test for greater than zero. In the preferred embodiment of this invention, such comparisons are made by a comparison unit provided for each functional unit. Instruction 3 is an unrelated instruction needed to ensure that the predication value computed in instruction 3 is available for instruction 1 in the next iteration of the loop. The predication of instruction 1 will abort the decrement of the count in register L0 if L0 were 0 in the prior iteration of the compare instruction 3.

The preferred embodiment of this invention stores the counter value in a separate register L0 to the predicate p0. Contrary to this use, in about 80% of cases only the predicate is needed and not the actual value. Thus the compare instructions need only write a compare result to a predication register and not write the result of a calculation as in the prior art.

In one embodiment of this invention, there is a one cycle delay slot following the compare instruction before the new predicate value can be used to control execution of an instruction. This is shown in code example 12.

| Inst 1 | [p0] | SUB | L0, 1, L0 |
|---|---|---|---|
| Inst 2 | | CMPEQ | L0, 0, p1 |
| Inst 3 | | ... | |
| Inst 4 | [p1] | SUB | L0, 1, L0; single delay slot of p0 |

CODE EXAMPLE 12

Instruction 3 is an unrelated instruction to enable the value of predicate register p1 to be available for instruction 4. In code example 12, the compare instruction has a delay slot as the predication requires a single cycle before the predicate can be read.

In a prior art central processing unit operating according to FIGS. 8 and 9, proper operation of predication requires register bypassing. Consider code example 13.

| | | ; A12 set by some other operation |
|---|---|---|
| Inst 1 | [A0] | ADD A10, A11, A12 |
| Inst 2 | | ADD A12, A13, A14 |

CODE EXAMPLE 13

In code example 13, A12 has a value before instruction 1 conditionally executes. If the value of predicate register A0 permits execution of instruction 1, then A12 takes a new value and the flow continues. If the value of predicate register A0 aborts instruction 1, then the previous value of A12 must be used. This requires register bypass of the value of register A12 calculated by instruction 1 to the input operand of instruction 2.

An attempt to converting convert this code example to the explicit register forwarding of this invention is shown in code example 14.

| | | ; L12 set by some other operation |
|---|---|---|
| Inst 1 | [p0] | ADD L10, L11, L12 (LF) |
| Inst 2 | | ADD L12(LF), L13, L14 |

CODE EXAMPLE 14

Instruction 1 is coded to store the result in both register L12 of the register file and in the corresponding forwarding register LF. If the value of predicate register p0 causes instruction 1 to abort, then instruction 1 would output zero. Storing this in forwarding register LF provides instruction 2 with incorrect data if instruction 1 aborts. This is prevented by not using explicit register bypassing in this case. As shown in code example 15, another unrelated instruction is inserted between instructions 1 and 2.

| | | ; L12 set by some other operation |
|---|---|---|
| Inst 1 | [p0] | ADD L10, L11, L12 |
| Inst 3 | | ... |
| Inst 2 | | ADD L12, L13, L14 |

CODE EXAMPLE 15

This provides the time for the write to and read from the register file to complete for instruction 2. This intervening instruction allows the results to merge into the register file and for the original previously set value in register 12 to be used.

Use of the explicit register file bypass of this invention can cause problems with register pair instructions. Conventionally register pair instructions enable data from two registers to be processed as a unit. This can cause problems with explicit register bypass as shown below. Code example 16 illustrates two single instructions storing two results in two registers and a following instruction using this data as a register pair.

| Inst 1a | ADD | L10, L14, L12 |
| Inst 1b | ‖ ADD | L11, L15, L13 |
| Inst 2 | ADD2W | L13:L12, L3:L2, L15:L14 |

CODE EXAMPLE 16

In code example 16, instructions 1a and 1b execute in parallel on differing functional units. The "‖" symbol indicates this parallel operation. Instruction 2 is a register pair instruction which adds 2 32-bit values in source 1 (L13:L12) to 2 32-bit values in source 2 (L3:L2) writing 2 32-bit results into the destination (L15:L14). This is known as a single instruction multiple data (SIMD) operation. This code example operates correctly if central processing unit 1 operates according to FIG. 7 or operates according to FIG. 8 with the prior art implicit register file bypassing as illustrated in FIG. 9. If used with explicit register bypassing of this invention the data destined for registers L12 and L13 would be in two different forwarding registers. This would prevent the register pair add of instruction 2 from having timely access to this data.

There are three ways to deal with this problem. First, is to use another register pair instruction to generate the register pair data. This is shown in code example 17.

| Inst 1 | DADD L11:L10, L15:L14, L13:L12 (LF) |
| Inst 2 | ADD2W LF, L3:L2, L15:L14 |

CODE EXAMPLE 17

The DADD instruction writes both 32-bit words into the register pair L13:L12. Thus all the data is stored in a single forwarding register LF for explicit use by instruction 2. Second, another instruction can be inserted before the register pair instruction as shown in code example 18.

| Inst 1a | ADD | L10, L14, L12 |
| Inst 1b | ‖ ADD | L11, L15, L13 |
| Inst 3 | ... | |
| Inst 2 | ADD2W | L13:L12, L3:L2, L15:L14 |

CODE EXAMPLE 18

Inserted instruction 3 enables the write to the register file to complete so that instruction 2 can read the correct data. This avoids the problem but gives up any advantage of explicit register file bypassing. The final solution uses MERGE instruction to merge the two values stored in registers L12 and L13 as shown in code example 19.

| Inst 1a | ADD | L10, L14, L12 |
| Inst 1b | ‖ ADD | L11, L15, L13 |
| Inst 3 | MERGE | L12, L12, L13:L12 (LF) |
| Inst 2 | ADD2W | LF, L3:L2, L15:L14 |

CODE EXAMPLE 19

This merge instruction makes sure that the data needed by instruction 2 is stored in the same forwarding register. This is a lower power alternative. If the architecture does not permit options 1 or 3, then avoiding register bypass according to option 2 is necessary. Thus the benefit of explicit register bypass for register pair instructions will be lost. This is generally a small problem because SIMD instructions are typically used in pipelined algorithms.

This invention enables all features of a normal predicated instruction set while maintaining clock speed using register file bypass. Explicit register bypass is used where the forwarding registers are explicitly addressable. The bypass hardware only needs to compare the destination register with a single value to decide whether the write to the register file. This reduces the hardware overhead by an order of magnitude. The receiving instruction uses an explicit address to use either a register or an explicit forwarding register. This explicit bypass completely removes the detection logic from making an execute time decision. The problem is moved purely into a decode problem. Thus any scheduling is handled during compile and not at run time. This reduces the needed circuits and power consumption. This invention provides predication registers separate from general purpose registers. Predication write instructions are used to write to a bit wide predication register file. This removes the interdependency from the bypass logic.

This application describes rules to make sure that instruction sequence behave as expected. The addition of NOPs after each multiple cycle instruction to allow register file writing only prevents forwarding from being used in these cases and so allows the code to be single assignment register allocated so that the code can be fully interruptible.

These features reduce hardware cost from minimal bypass detection logic, lower power from less hardware and reduced writes to the register file. Clock speed is scalable from lack of interaction between predication and bypassing and the delay slot on the predication register file access.

Interruptability and predication coherence is maintained either globally or local across an application, more features produce more overhead to performance. This overhead can be tuned to the application. If little or no interuptability is needed it does not have to add any cycle overhead.

What is claimed is:

1. A data processing apparatus operating in response to a sequence of instructions comprising:

a data register file including a plurality of data registers storing data;

a functional unit having at least one data input and a data output, said functional unit operable to perform an instruction specified data operation upon data received at said at least one data input generating result data at said data output;

a forwarding register having an input connected to said data output of said functional unit receiving said result data, and an output;

a bypass detection unit comparing an instruction specified destination register within said register file of just completing instruction with an instruction specified input operand of an instruction just beginning execution, said comparator generating a comparison signal indicating whether register bypass is needed;

a multiplexer having a first input connected to said data register file for receiving data read from an instruction specified input operand register of said plurality of data registers, a second input connected to said output of said forwarding register for receiving data read from said forwarding register and an output connected to a first data input of said at least one data input of said functional unit, said multiplexer connected to said bypass detection unit and operable to connect said data read from said instruction specified input operand register to said first data input of said functional unit in response to a comparison signal indicating register bypass is not needed, and to connect said data read from said forwarding register to said first data input of said functional unit in response to a comparison signal indicating register bypass is needed; and said data register file is connected to said output of said forwarding register and selectively operable to either write said data read from said forwarding register into said instruction specified destination register in response to a kill bit within said instruction having a first digital state or not write said data read from said forwarding register into said instruction specified destination register in response to a kill bit within said instruction having a second digital state opposite to said first digital state.

2. The data processing apparatus of claim 1, further comprising:

a second multiplexer having a first input connected to said data register file for receiving data read from an instruction specified second input operand register of said plurality of data registers, a second input connected to said output of said forwarding register for receiving data read from said forwarding register and an output connected to a second data input of said at least one data input of said functional unit;

a second functional unit having a first data input, a second data input and a data output, said second functional unit operable to perform a second instruction specified data operation upon data received at said at least one data input generating result data at said data output;

a second forwarding register having an input connected to said data output of said second functional unit receiving said result data, and an output connected to said second input of said second multiplexer; and said bypass detection unit further comparing an instruction specified destination register within said register file of just completing instruction on said second functional unit with an instruction specified input operand of an instruction just beginning execution on said first functional unit, said comparator generating a second comparison signal indicating whether register bypass is needed with respect to said instruction specified destination register of said instruction just completing on said second functional unit;

said second multiplexer operable to connect said data read from an instruction specified second input operand register to said second data input of said functional unit in response to a second comparison indicating bypass is not needed, and to connect said data read from said second forwarding register to said second data input of said functional unit in response to a second comparison signal indicating bypass is needed.

3. The data processing apparatus of claim 1, wherein:

said data register file recalls data from a register pair in said data register including a data register corresponding a register number indicated in a operand field of said instruction and a data register having a corresponding register number one greater than said register number indicated in said operand field of said instruction register number in response to a register pair instruction;

said functional unit further operable to perform an instruction specified data operation upon register pair data received at said at least one data input generating register pair r said data register file further operable in response to a register pair instruction to not write said data read from said forwarding register into said data register file in response to said kill bit having said second digital state and a least significant bit of a data destination field in said instruction having a third digital state, write only corresponding data from said forwarding register into said data register file of a data register having a corresponding odd register number in response said kill bit having said second digital state opposite and said least significant bit of said data destination field in said instruction having a fourth digital state different from said third digital state, write only corresponding data from said forwarding register into said data register file of a data register having a corresponding even register number in response said kill bit having said first digital state and said least significant bit of said data destination field in said instruction having said third digital state, and write data from said forwarding register into said data register file of a register pair in response said kill bit having said first digital state opposite and said least significant bit of a data destination field in said instruction having said fourth digital state.

4. A data processing apparatus operating in response to a sequence of instructions comprising:

a data register file including a plurality of data registers storing data;

a functional unit having at least one data input and a data output, said functional unit operable to perform an instruction specified data operation upon data received at said at least one data input generating result data at said data output;

a forwarding register having an input connected to said data output of said functional unit receiving said result data, and an output; and a multiplexer having a first input connected to said data register file for receiving data read from an instruction specified input operand register of said plurality of data registers, a second input connected to said output of said forwarding register for receiving data read from said forwarding register and an output connected to a first data input of said at least one data input of said functional unit, said multiplexer operable in response to a normal operand instruction type to connect said data read from an instruction specified input operand register to said first data input of said functional unit, and in response to an explicit register bypass instruction type to connect said data read from said forwarding register to said first data input of said functional unit; said data register file further operable to write data from said output of said forwarding register into an instruction specified destination register of said plurality of data registers in response to a destination register field of said instruction specifying a register number less than or equal to a number of registers in said data register file, and not write data from said output of said forwarding register into said instruction specified destination register of said plurality of data registers in response to a destination register field of said instruction specifying a register number greater than said number of registers in said data register file.

5. The data processing apparatus of claim 4, further comprising:

a second multiplexer having a first input connected to said data register file for receiving data read from an instruction specified second input operand register of said plurality of data registers, a second input connected to said output of said forwarding register for receiving data read from said forwarding register and an output connected to a second data input of said at least one data input of said functional unit;

a second functional unit having a first data input, a second data input and a data output, said second functional unit operable to perform a second instruction specified data operation upon data received at said at least one data input generating result data at said data output;

a second forwarding register having an input connected to said data output of said second functional unit receiving said result data, and an output connected to said second input of said second multiplexer; and a third multiplexer having a first input connected to said data register file for receiving data read from a second instruction specified first input operand register of said plurality of data registers, a second input connected to said output of said second forwarding register for receiving data read from said second forwarding register and an output connected to a first data input of said at least one data input of said second functional unit, a fourth multiplexer having a first input connected to said data register file for receiving data read from said second instruction specified second input operand register of said plurality of data registers, a second input connected to said output of said second forwarding register for receiving data read from said second forwarding register and an output connected to a first data input of said at least one data input of said second functional unit, said second multiplexer operable in response to a normal operand instruction type to connect said data read from an instruction specified second input operand register to said second data input of said functional unit, and in response to a explicit register bypass instruction type to connect said data read from said second forwarding register to said second data input of said functional unit; said second multiplexer operable in response to a normal operand instruction type to connect said data read from an instruction specified third input operand register to said first data input of said second functional unit, and in response to a explicit register bypass instruction type to connect said data read from said second forwarding register to said first data input of said second functional unit; and said fourth multiplexer operable in response to a normal operand instruction type to connect said data read from an instruction specified fourth input operand register to said second data input of said second functional unit, and in response to a explicit register bypass instruction type to connect said data read from said forwarding register to said second data input of said second functional unit.

6. The data processing apparatus of claim 4, wherein:

said normal operand instruction type has a input operand field of said instruction specifying a register number less than or equal to said number of registers in said data register file; and said explicit register bypass instruction type has an input operand field of said instruction specifying a register number greater than said number of registers in said data register file.

* * * * *